United States Patent [19]

Williams

[11] Patent Number: 5,749,604
[45] Date of Patent: May 12, 1998

[54] PIPE COUPLING SYSTEM AND METHOD

[76] Inventor: Anthony D. Williams, 929 Washington St., San Carlos, Calif. 94070

[21] Appl. No.: 872,715

[22] Filed: Apr. 23, 1992

Related U.S. Application Data

[63] Continuation-in-part of Ser. No. 541,308, Jun. 21, 1990, abandoned, which is a continuation-in-part of Ser. No. 336,671, Apr. 11, 1989, Pat. No. 5,064,225, which is a continuation-in-part of Ser. No. 179,062, Apr. 8, 1988, Pat. No. 4,819,969.

[51] Int. Cl.$^6$ .................................................. F16L 35/00
[52] U.S. Cl. ................... 285/39; 285/332; 285/334.4; 285/382; 285/399; 285/906; 29/525
[58] Field of Search ............................ 285/39, 399, 382, 285/906, 332, 334.4; 29/525; 403/368

[56] References Cited

U.S. PATENT DOCUMENTS

| | | | |
|---|---|---|---|
| 2,345,750 | 4/1944 | Hohwart | 403/368 X |
| 3,058,777 | 10/1962 | Froedge | 29/525 X |
| 3,269,743 | 8/1966 | Barrela | 29/525 X |
| 3,272,539 | 9/1966 | Asbury | 285/382 X |
| 3,466,066 | 9/1969 | Dawson | 285/39 |
| 4,328,983 | 5/1982 | Gibson | 285/382 |
| 4,769,892 | 9/1988 | Kneller | 29/525 X |
| 4,769,897 | 9/1988 | Moseman | 285/382 X |

FOREIGN PATENT DOCUMENTS

| | | | |
|---|---|---|---|
| 1141450 | 9/1957 | France | 285/382 |
| 596135 | 12/1947 | United Kingdom | 29/525 |
| 2106606 | 4/1983 | United Kingdom | 285/382 |

*Primary Examiner*—Dave W. Arola
*Attorney, Agent, or Firm*—Flehr Hobach Test Albritton & Herbert LLP

[57] ABSTRACT

Pipe coupling system and method in which a tapered wall is formed on one of two tubular pipe members for press-fit engagement with a wall of the second pipe member, and the two pipe members are pressed together in an axial direction to bring the tapered wall and the other wall into direct press-fit engagement with each other. The two pipe members can, for example, be a length of copper water pipe and a copper pipe fitting, and in certain disclosed embodiments, the pipe members are drawn together by a tool having axially movable jaws which engage the pipe members and are driven together in the axial direction by an actuator and linkage which move in a perpendicular direction.

7 Claims, 4 Drawing Sheets

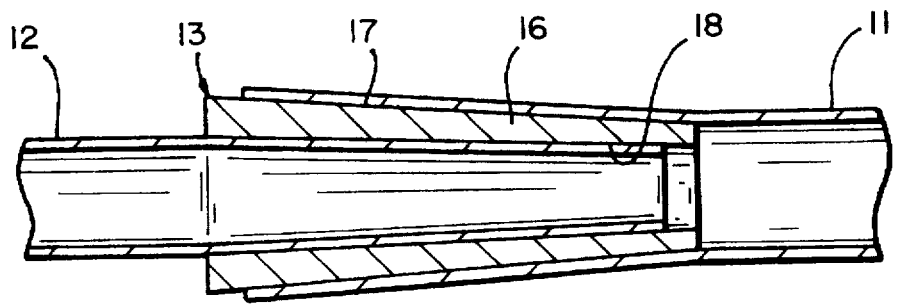
FIG_1
| ELEMENT SIZES OD x ID | SMALL END OD x ID | BIG END OD x ID | LENGTH | OUTER WALL ANGLE | INNER WALL ANGLE |
|---|---|---|---|---|---|
| 3.00 x 2.750<br>1.66 x 1.250 | 2.740 x 1.6512 | 2.7669 x 1.663 | 5.375 | .2867° | .1258° |
| 1.66 x 1.250<br>0.75 x 0.584 | 1.374 x 0.7408 | 1.3903 x 0.749 | 2.500 | .3750° | .1875° |
| 0.75 x 0.584<br>0.50 x 0.334 | 0.578 x 0.4876 | 0.6028 x 0.500 | 1.875 | .7586° | .3794° |
| 2.25 x 1.874<br>1.66 x 1.250 | 1.749 x 1.6442 | 2.7669 x 1.663 | 5.375 | .2867° | .1258° |
| 1.05 x 0.850<br>0.75 x 0.584 | 0.824 x 0.7325 | 0.8570 x 0.749 | 2.500 | .7586° | .3794° |
| 1.05 x 0.850<br>0.50 x 0.334 | 0.824 x 0.4939 | 0.8364 x 0.500 | 1.875 | .3794° | .1875° |
FIG_2
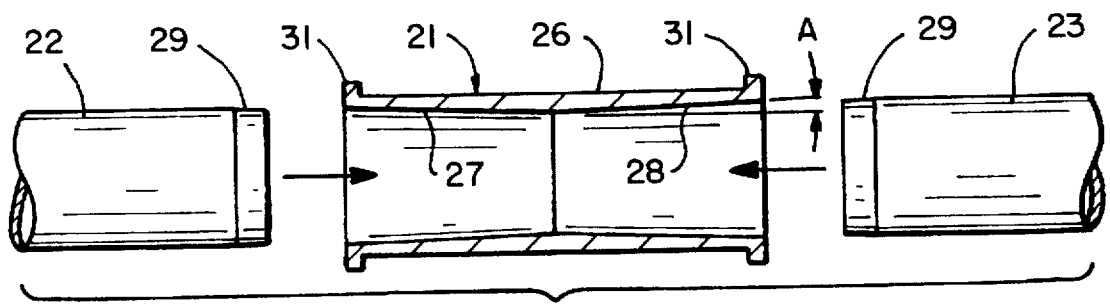
FIG_3

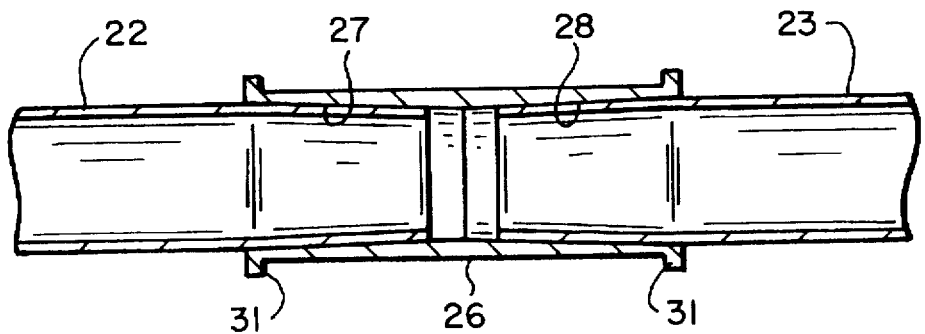
FIG_4
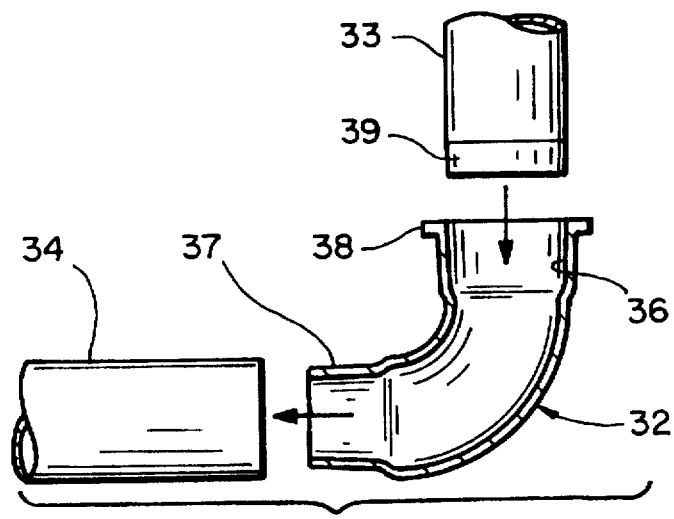
FIG_5
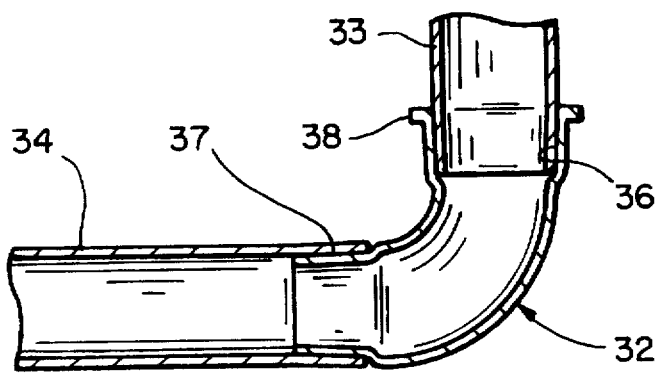
FIG_6

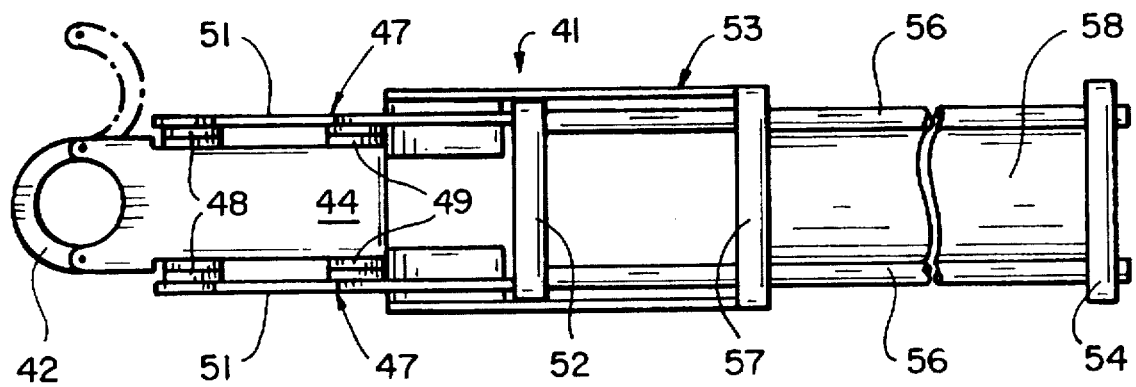
FIG_7
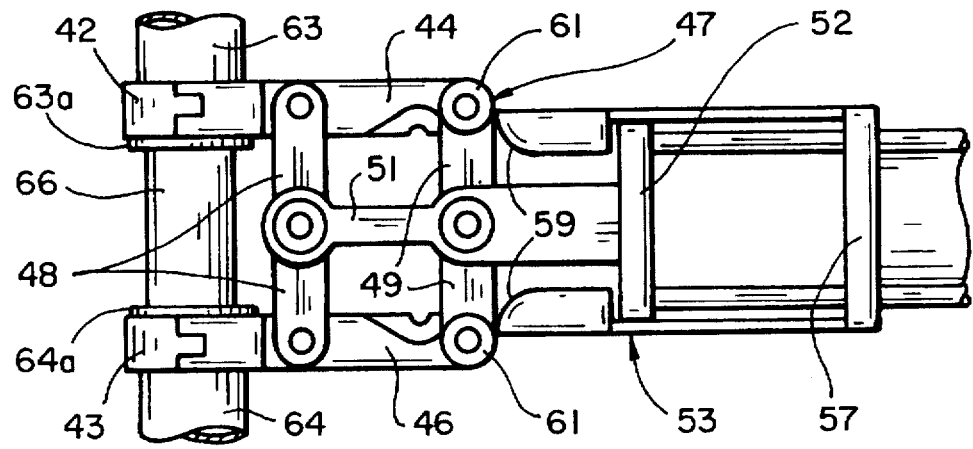
FIG_8
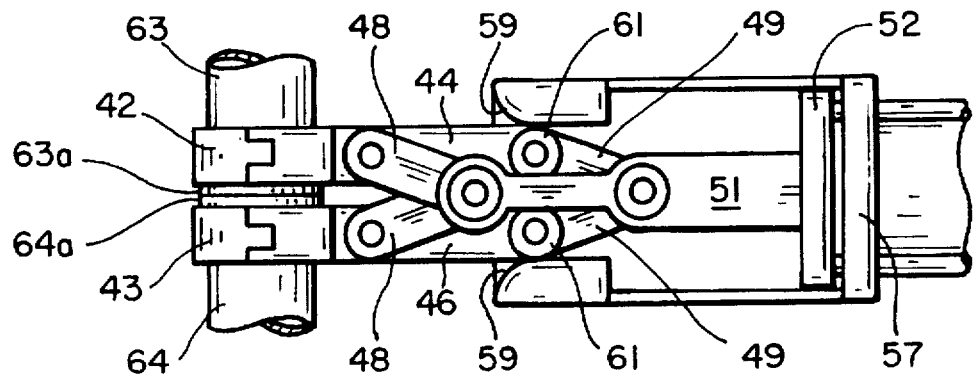
FIG_9

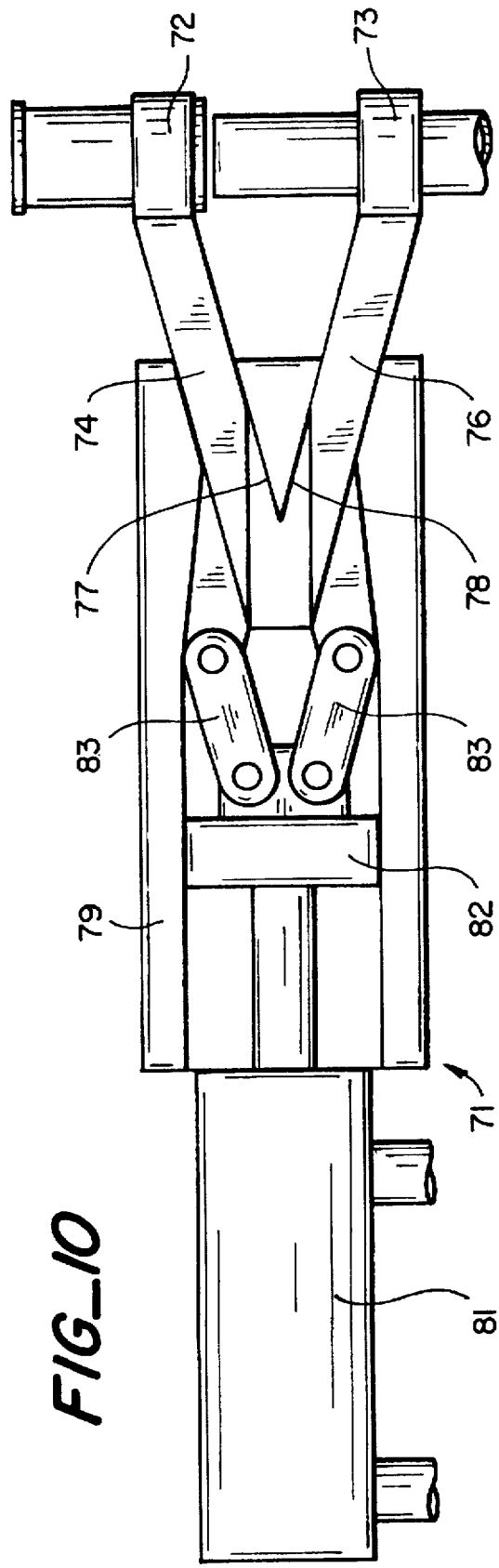
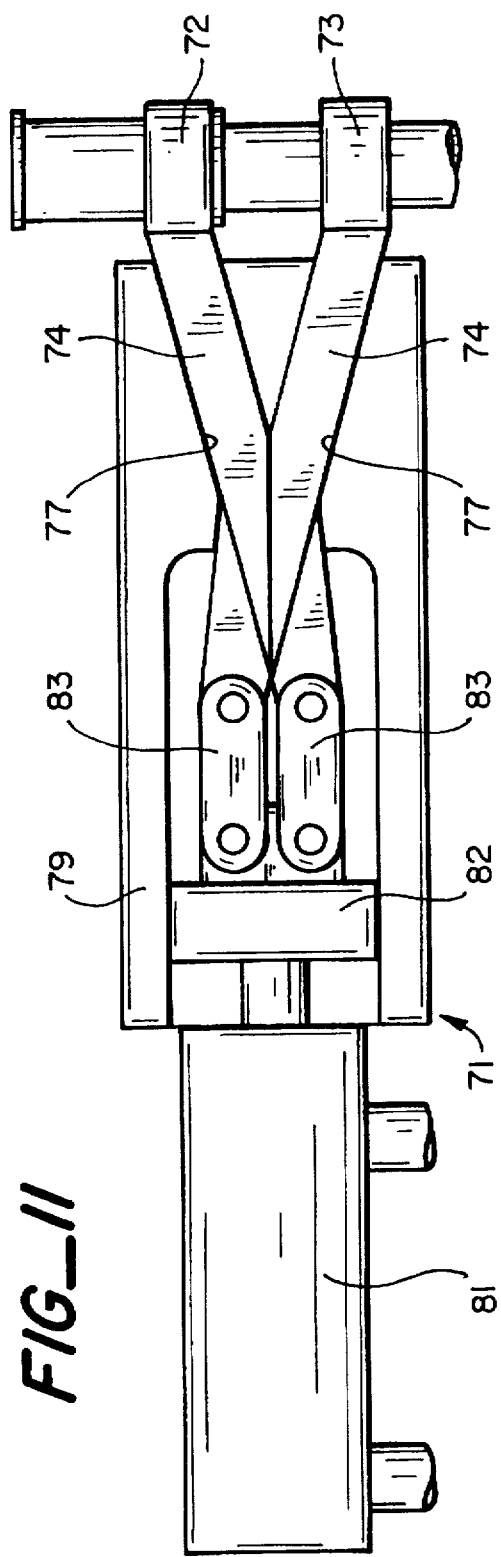
FIG_10
FIG_11

PIPE COUPLING SYSTEM AND METHOD

This is a continuation-in-part of Ser. No. 07/541,308, filed Jun. 21, 1990, now abandoned; a continuation-in-part of Ser. No. 336,671, filed Apr. 11, 1989, now U.S. Pat. No. 5,064,225; a continuation-in-part of Ser. No. 179,062, filed Apr. 8, 1988, now U.S. Pat. No. 4,819,969.

This invention pertains generally to the coupling of tubular elements and, more particularly, to a coupling system and method for copper water pipes and the like.

Copper water pipes and fittings employed therewith are commonly soldered together. This process requires heat which is typically provided by a torch with an open flame, and this poses a fire hazard where combustible materials are present, for example, in houses with wood framing. This problem is of even greater concern in older structures where the wood has dried out and is more readily combustible.

Another problem with the soldering of copper pipes is the concern about possible poisoning from materials such as lead which are present in the solder. To avoid such poisoning in recent years, solders have been made which do not contain lead, but these solders tend to be relatively expensive.

It is in general an object of the invention to provide a new and improved system and method for joining tubular elements such as copper pipe together.

Another object of the invention is to provide an new and improved system and method of the above character which overcome the limitations and disadvantages of techniques heretofore utilized for joining such elements together.

These and other objects are achieved in accordance with the invention by forming a tapered wall on one of two tubular pipe members for press-fit engagement with a wall of the second pipe member, and pressing the two pipe members together in an axial direction to bring the tapered wall and the other wall into direct press-fit engagement with each other. The two pipe members can, for example, be a length of copper water pipe and a copper pipe fitting, and in certain disclosed embodiments, the pipe members are drawn together by a tool having axially movable jaws which engage the pipe members and are driven together in the axial direction by an actuator and linkage which move in a perpendicular direction.

FIG. 1 is a fragmentary sectional view of one embodiment of a coupling according to the invention.

FIG. 2 is a table of dimensions for coupling sleeves of the type illustrated in FIG. 1 for use with tubular elements of different sizes.

FIG. 3 is an exploded view of another embodiment of a coupling according to the invention.

FIG. 4 is a sectional view of the assembled embodiment of FIG. 3.

FIG. 5 is an exploded view of another embodiment of a coupling according to the invention.

FIG. 6 is a sectional view of the assembled embodiment of FIG. 5.

FIG. 7 is a top plan view of one embodiment of a tool for use in assembling a pipe joint in accordance with invention.

FIG. 8 is a side elevational view of the embodiment of FIG. 7, showing the tool in a first operational position with some pipe fittings.

FIG. 9 is a view similar to FIG. 8, showing the tool in a second operational position with the pipe fittings.

FIG. 10 is a centerline sectional view of another embodiment of a tool for use in assembling a pipe joint in accordance with the invention, showing the tool in a first operational position with some pipe fittings.

FIG. 11 is a view similar to FIG. 10, showing the tool in a second operational position with the pipe fittings.

In FIG. 1, two tubular elements 11, 12 of different diameters are joined together by a coupling sleeve 13. The coupling sleeve has an axially elongated body 16, with a conically tapered outer wall 17 and a conically tapered inner wall 18 disposed concentrically of each other. The diameter and the angle of taper of outer wall 17 are selected to provide a press fit with the inner wall of the larger tubular section to be joined by the sleeve, and the diameter and the angle of taper of inner wall 18 are selected to provide a press fit with the outer wall of the smaller section of tubing to be joined by the sleeve.

Examples of suitable dimensions for coupling sleeves for joining tubular elements of different sizes together are given in the table of FIG. 2. All of the dimensions in this table are in units of inches, except the angles which are in degrees. The tubular elements which are included in this table are utilized in a yagi antenna as described in greater detail in U.S. Pat. No. 4,819,969 which has now issued on the parent application. Similar considerations apply, however, in designing couplings for use with tubular elements of other materials and dimensions and for use in other applications.

In the first line of the table, for example, the larger tubular element 11 has an inner diameter of 2.75 inches, and the coupling sleeve has an outer diameter of 2.74 inches at its smaller end and an outer diameter of 2.7669 inches at its larger end. When the sleeve is pressed into the tubular section, the end portion of the tube is expanded or flared slightly by the sleeve.

In this same example, the smaller tubing section 12 has an outer diameter of 1.66 inch, and the coupling sleeve has an inner diameter of 1.663 inch at its larger end and 1.6512 inch at its smaller end. When the sleeve is pressed onto the end portion of tubular section 12, the end portion is compressed or tapered slightly.

The coupling sleeve preferably has a length on the order of 2–3 times diameter of the diameter, and in the example given in the first line of the table, the sleeve has a length on the order of 5.375 inches and projects about 0.25 inch from the ends of the tubular sections.

It has been found that the best results are obtained when the outer wall of the coupling sleeve has a greater angle of taper than the inner wall of the sleeve. More specifically, it has been found that the angle of taper of the outer wall should be on the order of two times the angle of taper of the inner wall. Thus, for example, in the example given in the first line of the table of FIG. 2, the outer wall of the sleeve has an angle of taper of 0.2867°, and the inner wall has an angle of taper of 0.1258°.

It is also desirable that the coupling sleeve have a sufficient wall thickness to prevent deformation of the sleeve when it is pressed into and onto the elements to be joined together. Thus, in the example from the first line of the table, the sleeve has an average wall thickness on the order of 0.545 inch, whereas tubular members 11, 12 have wall thicknesses of 0.125 and 0.202 inch, respectively.

The coupling sleeve can be fabricated of the same material as the elements to be joined together, e.g. aluminum, or any other suitable material.

The press fitting by which the tubular elements and the coupling sleeve are joined together is conveniently done by pressing the sleeve into position on the smaller tubing section first, then pressing the sleeve into position within the larger section. This method of assembly has the advantage that the sleeve can be engaged directly by the press at all times, which means that the sleeve can be positioned as desired on the smaller tubing section and then pressed to the desired position within the larger section without disturbing the position of the sleeve on the smaller section. Any other suitable method or order of assembly can, of course, be employed.

FIGS. 3 and 4 illustrate the use of a coupling sleeve 21 for joining together two tubular elements 22, 23 of similar diameter. These elements might, for example, be two lengths of copper pipe of the type commonly employed in a domestic water supply system.

Coupling sleeve 21 has a cylindrical outer wall 26 and a pair of oppositely tapered inner walls 27, 28. Each of the tapered walls has a length on the order of 1.5 times the outer diameter of the pipes to be joined to the sleeve and an angle of taper A which preferably is no greater than about 8.0° and can, for example, be on the order of 3.0°. The internal diameter of the sleeve at the ends of the sleeve is somewhat greater than the outer diameter of tubular elements 22, 23, and the internal diameter toward the center of the sleeve is somewhat smaller than the outer diameter of the tubular elements. Thus, when the tubular elements are pressed axially together with the coupling sleeve, they form a tight press-fit as in the other embodiments.

The end portions of tubular elements 22, 23 are not tapered, although they are provided with a small chamfer 29, e.g. 0.5°, which is helpful in forming a good seal between the tubular elements and the sleeve if the tubing has a longitudinally extending seam, as copper pipe and other tubing often does. If the tubular elements do not have a seam, the chamfer is not necessary and can be omitted.

Alternatively, the sleeve can have straight walls, and the tapers can be formed on the tubular elements. It is also possible for both the tubular elements and the sleeve to be tapered. However, for most applications, the simplest and most convenient embodiment is the one in which the sleeve is tapered and the tubular elements are not.

Radial flanges 31 are formed at the ends of sleeve 21 to facilitate pressing the sleeve and the tubular elements together. These flanges provide axially facing surfaces which are readily engaged by press or other tool which is utilized to assemble the coupling.

FIGS. 5 and 6 illustrate the invention in connection with a street elbow 32 which joins pipes 33, 34 together at an angle of 90°. The street elbow has an L-shaped body with an internal taper 36 at one end and an external taper 37 at the other. The outer end of the internal taper 36 has a diameter slightly greater than the outer diameter of the pipe 33 which is connected thereto, and the inner end of this taper has a diameter slightly less than the outer diameter of the pipe. Similarly, the outer end of the external taper 37 has a diameter slightly smaller than the inner diameter of the pipe 34 which is connected thereto, and the inner end of this taper has a diameter slightly greater than the inner diameter of the pipe. Each of the tapers preferably has an angle less than about 8.0°, with an angle on the order of 3.0° being suitable for many applications. A street elbow is often utilized in combination with another fitting such as a tee or another elbow, in which case pipe 34 would be part of the other fitting rather than being a separate pipe.

A radial flange 38 similar to flanges 31 is provided at the internally tapered end of the elbow to facilitate assembly of the coupling to pipe 33, and a chamfer 39 similar to chamfer 29 is provided at the end of pipe 32.

Although the invention has been illustrated with specific reference to only two pipe fittings, namely a coupling sleeve and a street elbow, it is equally applicable to most other types of fittings, including tees, male and female adapters, end caps, and the like. It is also possible to couple two sections of pipe together in a similar manner by providing one or both of them with a suitable taper.

FIGS. 7–9 illustrate one embodiment of a small, portable tool 41 for pressing copper pipes and fittings together with the force required to form the press-fit joints. This tool has a pair of jaws 42, 43 for engagement with the pipe and fitting. The jaws are mounted on a pair of parallel arms 44, 46 which are linked together by collapsible linkages 47 which permit the arms to move toward and away from each other. The jaws pivot between the closed position shown in full lines in FIG. 7 and the open position shown in broken lines to permit the tool to be engaged with and disengaged from the pipes and fittings.

Each of the linkages includes two pairs of short links 48, 49 which are pivotally connected between the parallel arms and a drawbar 51 which is movable between extended and retracted positions in a direction generally parallel to the arms. The drawbars are affixed to a plate 52 which is slidably mounted on a frame 53. Plate 52 is connected to a second plate 54 by rods 56 which pass freely through openings in an end plate 57 of the frame. A hydraulic cylinder 58 is connected between plates 54 and 57 for moving drawbars 51 between their extended and retracted positions. The drawbars are normally in their extended position, and extension of the cylinder moves the drawbars to their retracted position.

Means is provided for moving parallel arms 44, 46 and the jaws carried thereby toward each other as the drawbar moves toward its retracted position. This means includes cam surfaces 59 on the frame 53 and cam followers 61 on links 49. The cam surfaces are positioned on opposite sides of the frame and curve inwardly toward each other, and the cam followers are positioned for engagement with the cam surfaces as the drawbar is retracted. The pulling action of the drawbar on the linkage tends to collapse it, and the cam followers travelling along the cam surfaces force the parallel arms together. When the drawbar is moved toward its extended position, it pushes on the links, moving them toward an extended position, separating the arms and jaws.

The tool is particularly suitable for use in tight places where access to the pipes and fittings is limited. A tool for use on ¾ inch copper pipe and fittings, for example, is only 2½ inches square in cross section and provides over 1½ inches of pipe movement in a single stroke.

In FIGS. 8 and 9, the tool is illustrated in conjunction with a pair of pipe fittings 63, 64 and a short pipe, or nipple, 66. The fittings have radial flanges 63a, 64a which are engaged by the jaws of the tool, and internally tapered walls adapted for press-fit engagement with the outer wall of the pipe.

In operation, the end portions of the nipple are inserted into the end portions of the fittings, and the jaws of the tool are closed about the fittings, with the tool in its extended or open position. When the hydraulic cylinder is actuated, the jaws bear against the radial flanges, urging the flanges toward each other and pressing the fittings into press-fit engagement with the nipple.

When the joint has been made, the hydraulic cylinder is deactuated, the jaws are opened, and the tool is removed from the pipe.

FIGS. 10–11 illustrate another embodiment of a tool 71 for pressing copper pipes and fittings together with the force required to form the press-fit joints. This tool has a pair of jaws 72, 73 similar to jaws 42, 43 for engagement with the pipe and fitting. The jaws are mounted on arms 74, 76 which are slidably mounted in diverging grooves 77, 78 in the inner faces of a pair of laterally spaced blocks 79 for movement between extended and retracted positions, with the jaws moving apart as the arms are extended and toward each other as the arms are retracted. The jaws are offset from the centerlines of the arms by an angle corresponding to the inclination of the grooves so that the jaws are parallel to each other and adapted for gripping pipes and fittings which are aligned linearly.

A double acting hydraulic cylinder 81 is mounted to blocks 79 for moving the arms between the extended and retracted positions, with the ram of the cylinder being connected to inner ends of the arms by a block 82 and links 83.

In operation and use, cylinder 81 is actuated to move arms 74, 76 to their extended position and thereby separate jaws 72, 73 which are then are engaged with the pipes and/or fittings to be pressed together. Once the jaws have been engaged, the cylinder is actuated to retract the arms along the converging paths defined by the grooves, thereby drawing the jaws and the pipe members together. After the pipe members have been pressed together, the jaws are disengaged, and the tool is removed.

Like the embodiment of FIGS. 7-9, tool 71 can apply a strong pressing force to the pipes and fittings and is particularly suitable for use in tight places where access is limited. This tool has the additional advantage of having fewer parts and being simpler in construction It is apparent from the foregoing that a new and improved tapered joint pipe coupling and tool have been provided. While only certain presently preferred embodiments have been described in detail, as will be apparent to those familiar with the art, certain changes and modifications can be made without departing from the scope of the invention as defined by the following claims.

I claim:

1. In a pipe coupling system: first and second tubular pipe members, one of said pipe members having a tapered wall adapted for press-fit engagement with a wall of the other of said pipe members, and means for pressing the two pipe members together to bring the tapered wall and the other wall into tight press-fit engagement, the tapered wall having a preformed taper which extends substantially the full length of the engagement between the walls of the pipe members, and said means for pressing the two pipe members together comprising a tool having jaws engagable with the pipe members and movable toward each other, linkage means connected to the jaws for moving the jaws toward each other along a straight line, and an actuator connected to the linkage means for moving the jaws toward each other with a force sufficient to press the pipe members together.

2. The pipe coupling system of claim 1 wherein the linkage means comprises a pair of parallel arms carrying the jaws and extending in a direction perpendicular to the line along which the jaws are moved, collapsible linkage interconnecting the two arms and constraining the arms for movement toward each other along the line, a drawbar connected between the actuator and the linkage for movement in a direction parallel to the arms to collapse the linkage, and cam means for urging the arms toward each other upon movement of the drawbar.

3. The pipe coupling system of claim 1 wherein the linkage means comprises a pair of arms which carry the jaws and are adapted for movement between extended and retracted positions along diverging paths, and link members interconnecting the actuator and the arms.

4. The pipe coupling system of claim 1 wherein the actuator comprises a hydraulic cylinder.

5. In a method of coupling two tubular pipe members together, the steps of: forming a tapered wall having a taper of predetermined length on one of the members for press-fit engagement with a wall of the other of said members, and pressing the two members together in an axial direction to bring the walls into press-fit engagement with each other for the length of the taper, the two pipe members being pressed together by engaging the members with the jaws of a tool which are interconnected by collapsible linkage for movement in a straight line in the axial direction, and drawing the linkage in a direction perpendicular to the axial direction to collapse the linkage and thereby move the jaws toward each other in a straight line.

6. The method of claim 5 wherein the linkage is drawn with a hydraulic cylinder.

7. In a method of coupling two tubular pipe members together, the steps of: forming a tapered wall having a taper of predetermined length on one of the members for press-fit engagement with a wall of the other of said members, and pressing the two members together in an axial direction to bring the walls into press-fit engagement with each other for the length of the taper, the two pipe members being pressed together by engaging the members with the jaws of a tool which are mounted on arms, and moving the arms between extended and retracted positions along converging paths to move the jaws toward each other.

* * * * *